United States Patent [19]

Santos

[11] Patent Number: 4,914,387

[45] Date of Patent: Apr. 3, 1990

[54] MAGNETIC SPEED SENSOR WITH AN ADAPTIVE THRESHOLD CIRCUIT FOR USE WITH A BEARING ASSEMBLY

[75] Inventor: A. J. Santos, Canton Center, Conn.

[73] Assignee: The Torrington Company, Torrington, Conn.

[21] Appl. No.: 177,290

[22] Filed: Apr. 4, 1988

[51] Int. Cl.[4] .................... G01P 3/487; H03K 19/18; H03K 5/153; F16C 32/00

[52] U.S. Cl. ..................................... 324/166; 307/309; 307/358; 324/174; 324/251; 324/252; 328/167; 384/8; 384/448

[58] Field of Search ............... 324/166, 173, 174, 207, 324/208, 235, 249, 251, 252; 307/309, 358; 328/165, 167; 384/448, 8; 364/565

[56] References Cited

U.S. PATENT DOCUMENTS

| | | | |
|---|---|---|---|
| 3,094,665 | 6/1963 | Wildman | 307/358 X |
| 3,845,412 | 10/1974 | Rearwin et al. | 375/86 X |
| 4,169,232 | 9/1979 | Henrich | 307/358 X |
| 4,241,309 | 12/1980 | Elder | 307/358 X |
| 4,259,637 | 3/1981 | Bloomfield et al. | 324/208 X |
| 4,339,727 | 7/1982 | Kage et al. | 307/358 X |
| 4,464,014 | 2/1987 | Eulenberg | 324/251 |
| 4,479,266 | 10/1984 | Eumurian et al. | 307/358 X |
| 4,524,932 | 6/1985 | Bodziak | 324/225 X |
| 4,635,142 | 1/1987 | Haughland | 307/358 X |
| 4,732,494 | 3/1988 | Guers et al. | 324/208 X |
| 4,769,597 | 9/1988 | Sano | 307/358 X |

Primary Examiner—Gerard R. Strecker
Attorney, Agent, or Firm—Frank S. Troidl

[57] ABSTRACT

A magnetic sensor bearing utilizes an adaptive threshold circuit for signal processing in order to compensate for external factors such as temperature, stress, aging, and external magnetic fields which all affect a fixed reference signal used with a comparator. As the magnetic sensor's output signal drifts due to these external factors, the adaptive threshold circuit causes the reference signals to drift in a complementary manner so that the magnetic sensor bearing continues to function properly in spite of the external factors.

11 Claims, 3 Drawing Sheets

FIG. 8
PRIOR ART
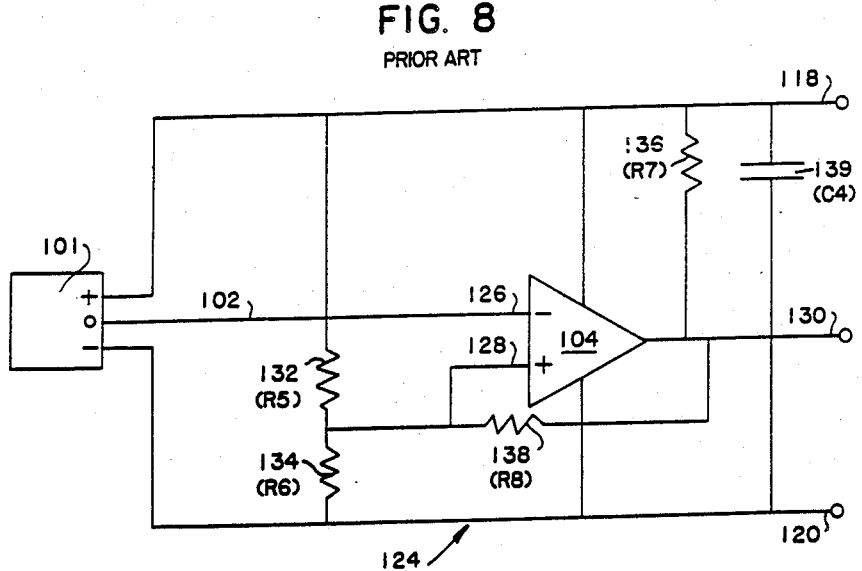
FIG. 9a
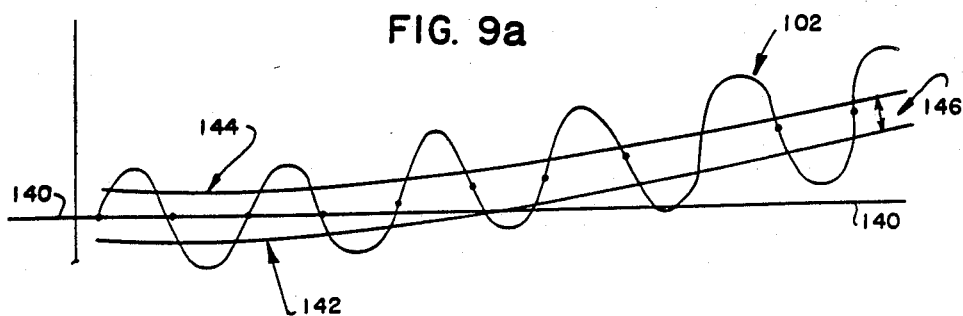
FIG. 9b
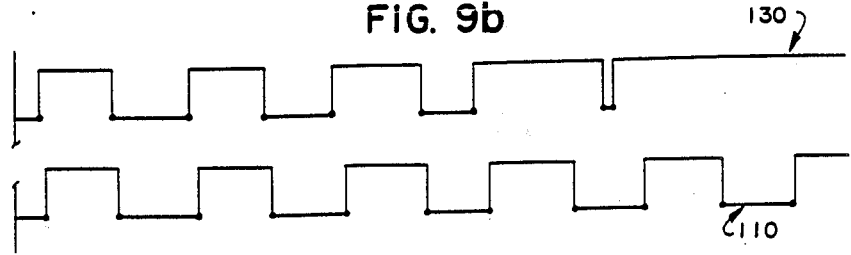
FIG. 9c

MAGNETIC SPEED SENSOR WITH AN ADAPTIVE THRESHOLD CIRCUIT FOR USE WITH A BEARING ASSEMBLY

This invention relates to a bearing which incorporates electrical circuits providing means to compensate for the effects of external factors on the output signal of a solid-state magnetic sensor. More specifically, this invention is a bearing with a compensating circuit for temperature, external pressure, external magnetic fields, and other external factors. This compensation enables the output signal from a solid-state magnetic sensor to be detected satisfactorily at relatively lower strength levels with increased reliability. The strength of the magnetic field may be affected by various factors. Two important factors of concern in this invention are the physical proximity of the sensor to the magnetically encoded ring, and the magnetic flux density generated by the encoded ring.

This invention is well-suited for use with a magnetic bearing speed sensor which utilizes a Hall-effect sensor, a magnetoresistor sensor, or a magnetotransistor sensor, especially for thrust bearings and radial bearings. Use of this invention with transmissions and anti-lock braking systems (ABS) is particularly appropriate.

Some prior art magnetic bearing sensors provide a linear output signal which is typically amplified before processing. The amplified signal is then compared to a fixed reference signal, e.g., a threshold voltage level, to gain the desired information from the sensor. The main problem with this type of prior art sensor signal processing is that the magnetic sensor output signal tends to vary substantially over time due solely to the effects of such external factors as temperature, pressure, and external magnetic fields. To a large degree, this variation is caused by the effects of these external factors on the magnetic sensor. Various techniques are used to compensate for these external effects, such as using two Hall effect sensors connected differentially to eliminate random noise and other "stray" potentials from the output. Examples of these types of prior art bearings are contained in U.S. Pat. No. 3,932,813 issued in the name of George A. Gallant on Jan. 13, 1976 for an "Eddy Current Sensor". Other prior art patents use low-pass filters and comparators and similar electrical or electronic devices to compensate for NRZ (Non-Return to Zero) signals or D.C. components in a signal where there is a transitional response signal with errors, or errors caused by continuously low or high signal levels being measured. Examples of these types of prior art circuits are contained in U.S. Pat. No. 4,339,727 for a "Waveform Converting Circuit" issued in the names of Kouzou Kage and Ikio Yoshida on July 13, 1982.

The magnetic sensor bearing with an adaptive threshold circuit of the present invention compensates for these external factors and their effects. This bearing provides the ability to adequately sense a relatively weak magnetic signal from the encoded magnetic ring being sensed. As the sensor ages, its sensitivity and that of its associated signal processing circuitry remains substantially constant. Compared to the fixed threshold processing circuits typically used in the prior art, the adaptive threshold circuit of the present invention can accurately process sensor output signals with peak-to-peak amplitudes as much as an order of magnitude less than the previous minimum required peak-to-peak amplitudes.

Briefly described, the magnetic sensor bearing with an adaptive threshold circuit comprises a bearing having a solid-state magnetic sensor which provides an output signal which is processed by a comparator, with a predetermined hysteresis band-width, into which is fed two input signals. The adaptive threshold circuit may be incorporated into an integrated circuit IC) chip, either wholly or partially. One input signal is the raw output signal from the solid-state magnetic sensor. The second input signal is generated by a circuit parallel to the first input signal circuitry. Te circuit for the second signal is a low-pass filter (RC) circuit which takes the raw output signal from the solid-state magnetic sensor and filters out all components of the signal above a predetermined frequency. This second input signal is then compared to the first input signal in the comparator to determine their relative voltage amplitudes. If the first input signal has a greater amplitude than the second input signal, then a positive comparator output signal results. If the first input signal has a smaller amplitude than the second input signal, then a negative comparator output signal is produced instead. This square-wave ("ON"-"OFF" or "0"-"1") comparator output signal can then be utilized for digital applications as desired.

This patent is related to U.S. Pat. No. 4,875,787 dated Oct. 24, 1989 for a "Thrust Bearing With A Magnetic Field Detector" filed Feb. 23, 1989 which is a continuation of Ser. No. 120,406 for a "Bearing With A Magnetic Field Detector" filed Nov. 13, 1987, now abandoned.

This invention may be better understood by reference to the following detailed description and drawings in which:

FIG. 8 is a schematic diagram of a typical prior art circuit used to process an electrical output signal of a sensor; and;

Figure 1:
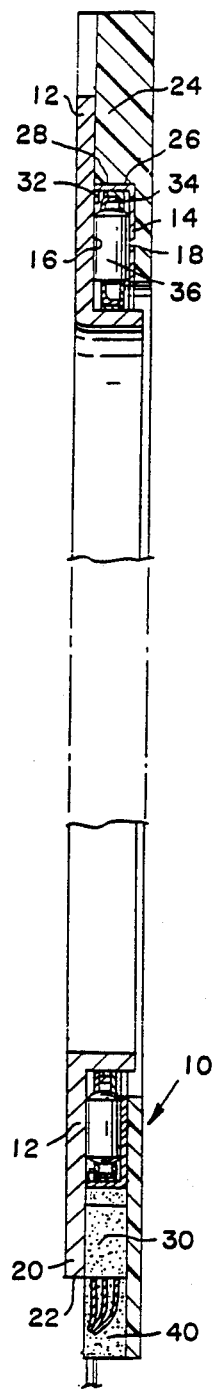
FIG. 1 is a fragmentary side elevational sectional view of one embodiment of the present invention incorporated in a thrust bearing.
Figure 2:
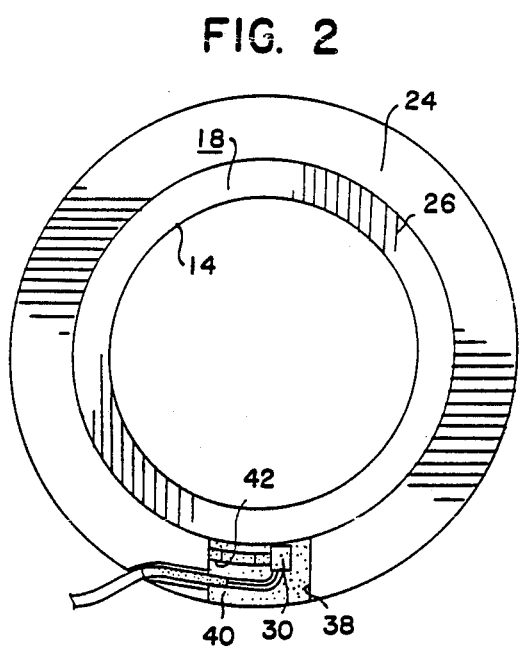
FIG. 2 is a front view in elevation of the thrust plate of FIG. 1 on which the magnetic sensor is mounted.
Figure 3:
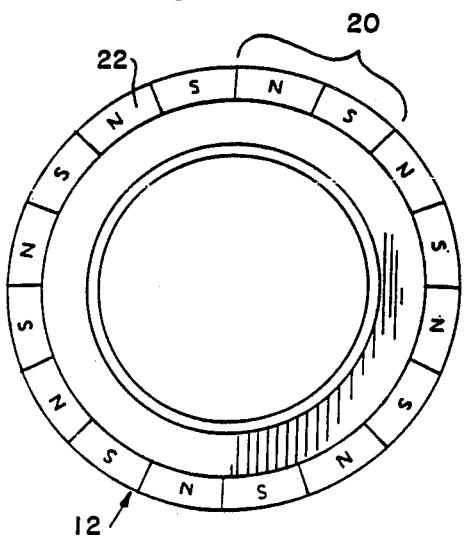
FIG. 3 is a front view in elevation of the permanently magnetized thrust plate of the thrust bearing in FIG. 1.
Figure 7:
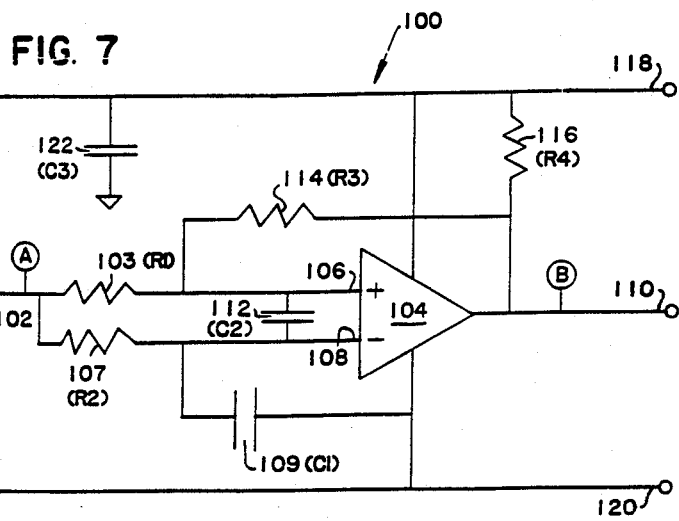
FIG. 7 is a schematic diagram of the adaptive threshold circuit of the present invention.

FIG. 9a, 9b, and 9c plot the output signals from the circuits shown in FIGS. 7 and 8 over time so as to allow comparison of the two different output signals. , Referring to the drawings, and more particularly to FIGS. 1-3, a bearing 10 of the preferred embodiment of the present invention is shown having a solid-state magnetic sensor assembly 30 integrally attached. Sensor assembly 30 includes a Hall-effect or similar magnetic sensor, along with an integrated circuit (IC) chip with output signal processing circuitry. Bearing 10 is a thrust bearing having two axially-spaced thrust plates—a first annular thrust plate 12 and a second annular thrust plate 14. Plate 12 has a radially extending raceway 16 on one side surface, and plate 14 has a radially extending raceway 18 on one side. Plate 12 also has permanently magnetized magnetic pole segments 20 which are located on the outer radial portion 22 of plate 12. Magnetic pole segments 20 are arranged in an alternating pattern as shown in FIG. 3—each North pole is between two South poles, and each South pole is between two North poles. The greater the number of pole segments 20 which are magnetized on plate 12, the greater the resolution of the output signal will be from sensor 31. The solid-state magnetic sensor assembly 30 is integrally attached to an annular plastic sensor support 24 which has a counterbore 26 housing the second annular thrust plate 14.

An annular flange-like outer peripheral wall 28 is integrally attached to plate 14 and makes a snug fit in the outer radial surface of counterbore 26. One axial edge of wall 28 is bent at an angle of about ninety (90) degrees to form a lip portion 32 which extends radially inward so as to axially restrain a roller cage 34 containing multiple rollers 36. Roller cage 34 and rollers 36 are axially positioned between raceways 16 and 18 which face each other.

A radial groove 38 radially penetrates sensor support 24 from counterbore 26 to the outer radial edge of support 24. The solid-state magnetic sensor assembly 30 is mounted in groove 38 with a resin 40 or similar material, as shown in FIG. 2. This mounting positions sensor assembly 30 so as to be radially aligned with and in close axial proximity to the magnetic pole segments 20. A signal processing circuit 100, described below in detail, is incorporated in an integrated circuit (IC) chip integral with sensor assembly 30. Preferably, all of the major components of circuit 100 are included on the IC chip, except for capacitor 109 (see FIG. 7) and capacitor 122 (when utilized).

An optional magnetic flux concentrator 42 is shown in FIG. 2 in a position circumferentially juxtaposed with sensor assembly 30. The function of the flux concentrator 42 is to provide a less resistant magnetic flux path in the immediate vicinity of the sensor assembly 30. Since magnetic flux tends to concentrate in areas of least resistance, concentrator 42 enhances the strength of the magnetic flux sensed in the magnetic sensor assembly 30.

Figures 4, 5:
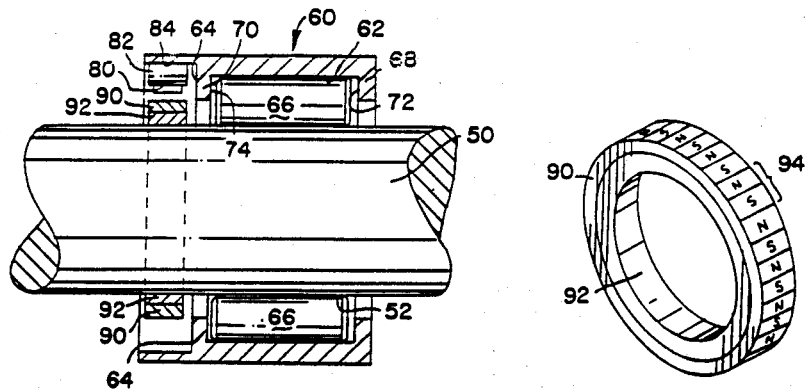
FIG. 4 is a partial side elevational sectional view of a second embodiment of the present invention mounted on a rotating shaft and incorporated in a radial bearing.
FIG. 5 is a perspective view of the magnetized ring portion of the radial bearing shown in FIG. 4.
Figure 6:
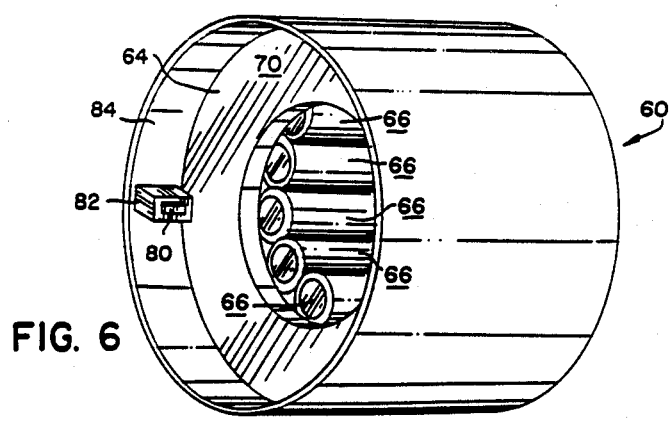
FIG. 6 is a perspective view of the outer race of the radial bearing shown in FIG. 4.

Turning now to FIGS. 4-6, a rotatable shaft 50 is mounted within an annular race 60. Shaft 50 has a raceway 52 around the circumference of a portion of its outer surface. Race 60 also has a raceway 62 on a portion of its inner surface (see FIG. 4) so as to be axially aligned with raceway 52. Race 60 also has a counterbore 64 in one axial end located farthest from raceway 62. Multiple rollers 66 are positioned between raceways 52 and 62, and are axially constrained by two annular flanges 68 and 70 depending radially inward from race 60. Shoulder 72 on the inner side of flange 68, and shoulder 74 on the facing side of flange 70, prevent rollers 66 from moving axially off of raceways 52 and 62.

A solid-state magnetic sensor assembly 80, similar to sensor assembly 30 in FIGS. 1-3, is affixed to a sensor mount 82 which is attached in turn to the inner surface 84 of counterbore 64. Sensor assembly 80 also comprises a Hall-effect or similar magnetic sensor, and an integrated circuit (IC) chip with output signal processing circuitry.

Permanent magnetic fields are provided by a magnetic ring 90 shown in FIG. 5. The annular ring 90 is attached to the shaft 50 with a concentric annular ring mount 92.

Ring 90 is permanently magnetized so as to provide multiple magnetic pole segments 94 around the entire circumference of ring 90. Magnetic pole segments 94 are arranged in an alternating pattern, similar to pole segments 20 in FIG. 3, so that each South pole is positioned between two North poles, and each North pole is similarly situated between two South poles.

Turning now to FIG. 7, solid-state magnetic sensor 101 (e.g., an analog Hall-effect sensor or a magnetoresistor sensor or a magnetotransistor sensor or a like magnetic sensor) generates a raw analog sensor output signal 102. See my copending U.S. Patent Application Ser. No. 120,406 filed on Nov. 13, 1987, for a description of the method by which the output signal from the magnetic sensor, or detector, is produced. Signal 102 is processed by the adaptive threshold circuit 100, most of which is incorporated in an IC chip integral with sensor assembly 30 or 80. Signal 102 feeds into adaptive threshold circuit 100 of the present invention, where it passes through resistor 103 (having a resistance R1) before feeding directly into a comparator 104 as a first input signal 106. As also shown in FIG. 7, signal 102 is split just before resistor R1 and passes through a parallel branch circuit which functions as a low-pass filter. Signal 102 passes through dropping resistor 107 (having a resistance R2) and feeds into comparator 104 as a second input signal 108 past filter capacitor 109 (having a capacitance C1). This low-pass filtering attenuates substantially all frequency components of signal 102 which are greater than a preselected threshold value. Input signal 108 is a "smoothed" version of signal 106, and signal 108 is effectively averaged to dampen large instantaneous variations in the amplitude of signal 102 and thereby eliminate discontinuities in the amplitude of that signal over time.

Comparator 104 takes input signals 106 and 108, and determines their relative values to generate a square-wave comparator output signal 110 that switches polarity when the relative voltage amplitudes of signals 106 and 108 are reversed. More specifically, when input signal 106 has a greater amplitude value than that of input signal 108, the resultant output signal 110 is a positive value; conversely, when input signal 108 has a greater amplitude value than the amplitude of signal 106, comparator output signal 110 reverses polarity and provides a negative value. Optional capacitor 112 (having a capacitance C2) reduces false triggering of comparator 104 caused by high-frequency noise on input signals 106 and 108. Resistor 114 (having a resistance R3), in conjunction with resistor 103, establishes the hysteresis band-width of comparator 104. Resistor 116 (having a resistance R4) serves as a pull-up resistor for the output signal 110. Lead 118 provides the power source for circuit 100, and optional capacitor 122 (having a capacitance C3) provides a cleaner power supply. Lead 120 serves as the common or ground lead. Capacitor 109 and optional capacitor 122 are the only electrical components, shown in FIG. 7, which are not incorporated in the integrated circuit (IC) chip portion of sensor assemblies 30 or 80.

The limitation on the minimum peak-to-peak amplitude value of signal 102 which can be accurately measured by comparator 104 with circuit 100 is approximately an order of magnitude less than the minimum value required for typical fixed threshold processing circuits of the prior art.

FIG. 8 illustrates a typical prior art signal processing circuit which does not compensate for the external factors discussed above. The raw output signal 102 from magnetic sensor 101 feeds directly into comparator 104 as one of two input signals for the comparator. This first input signal 126 is compared to a second input signal 128 which passes through a resistor 132 (having a resistance R5). Resistor 132 is one of two voltage divider resistors, the other being resistor 134 (having a resistance R6). Signal 128 also passes through a resistor 138 (having a resistance R8), which controls the hysteresis bandwidth. Resistor 136 (having a resistance R7) functions as a pull-up resistor for the comparator output signal 110. Capacitor 139 (having a capacitance C4) is connected between power lead 118 and a common (ground) lead 120 in order to minimize "clutter" or stray potentials on the power supply signal. The function of capacitor 139 is similar to other prior art circuits which attempt to better regulate the power supply.

The advantages of the present invention are further illustrated by reference to FIGS. 9a–9c. FIG. 9a graphs a typical drift of the raw output signal 102 over time relative to a fixed reference signal 140 (e.g., a fixed reference voltage) and two "drifting" reference signals 142 and 144. FIGS. 9b and 9c illustrate the processed output signals 130 and 110 for the prior art circuit shown in FIG. 8 and for the circuit of the present invention shown in FIG. 7, respectively, over time for the raw output signal graphed in FIG. 9a. FIG. 9b depicts the response of comparator output signal 130 (FIG. 8) to sensor output signal 102 (FIG. 9a) relative to a fixed reference signal 140. As the magnetic sensor is affected by external factors and causes signal 102 to drift upward, the alternating waveform of the sensor output signal is no longer symmetrically changing above and below the reference signal. Signal 102 has a value greater than reference signal 140 for a larger percentage of the waveform period, rather than only 50% of the period. This results in the square-wave output signal 130 being "ON" more than 50% of the time, and the "OFF" portion of the signal decreases correspondingly as shown in FIG. 9b. After signal 102 drifts for a period of time, comparator output signal 130 is no longer a "square-wave" signal and becomes an "ON" signal more and more, even though the magnetic sensor is actually producing an output signal which indicates an "ON" condition only 50% of the time. Conversely, the comparator output signal 110 of the magnetic sensor bearing of the present invention maintains its square waveform as signal 102 drifts upward. This results from the simultaneous drift of the "OFF" threshold signal level 142 and the "ON" threshold signal level 144 which results from the circuitry of FIG. 7. The hysteresis band-width 146 is maintained at a constant value which is controlled by the values R3 and R1 of resistors 114 and 103, respectively. This signal processing of circuit 100 provides an accurate correlation between the condition sensed by the magnetic sensor and the final processed output signal 110 from the comparator.

I claim:

1. A speed sensor assembly for use with a bearing assembly and a rotatable shaft, said sensor assembly comprising in combination:
   means for providing a magnetic signal corresponding to the rotational speed of said rotatable shaft, said means connected to said shaft;
   a solid-state magnetic sensor for detecting said magnetic signal, said sensor providing an analog output signal to a sensor output terminal, said output signal being proportionate to said magnetic signal and the speed of rotation of said shaft;
   means for mounting said sensor on said bearing assembly; and
   an adaptive threshold circuit connected to said sensor output terminal, and processing said sensor signal to provide a square-wave digital output signal, said adaptive threshold circuit consisting of:
      a comparator having first and second analog input signal terminals and one digital output signal terminal;
      a first analog comparator input signal terminal connected to said sensor output terminal and having a positive feedback signal from said comparator output terminal connected to said fist comparator input terminal to provide hysteresis; and
      a second analog comparator input signal terminal connected to said sensor output terminal and a low-pass filter in series, said low-pass filter consisting of a resistor and a capacitor;
      said comparator being responsive to the relative amplitudes of said fist and second input signals so as to provide a corresponding signal output signal to said comparator output terminal, and
      said adaptive threshold circuit being integrated entirely onto an integrated circuit chip, with the exception of said capacitor in said low-pass filter.

2. A speed sensor assembly according to claim 1 wherein said solid-state magnetic sensor is a Hall-effect sensor.

3. A speed sensor assembly according to claim 1 wherein said solid-state magnetic sensor is a magnetotransistor sensor.

4. A speed sensor assembly according to claim 1 wherein said solid-state magnetic sensor is a magnetoresistor sensor.

5. A speed sensor assembly according to claim 1 wherein said means for providing a magnetic signal comprises an annular magnetic ring mounted directly onto said shaft, said magnetic ring having alternating North and South magnetic poles around its circumference.

6. A speed sensor assembly according to claim 5 wherein said magnetic ring is mounted on an annular ring mount which is press fitted onto said shaft.

7. A sensor assembly according to claim 1 wherein said adaptive threshold circuit further consists of a second capacitor connected between said first and second comparator input terminals.

8. A sensor assembly according to claim 1 wherein said sensor assembly is incorporated on a printed circuit board.

9. A bearing assembly for use with a rotatable shaft, said assembly comprising in combination:
   a bearing mounted on said shaft, said bearing having a first member connected to said shaft so as to rotate with said shaft, and a second member relatively rotatable relative to said first member and said shaft;
   means for providing a magnetic signal corresponding to the rotational speed of said shaft, said means connected to said shaft;
   a Hall sensor for detecting said magnetic signal, said Hall sensor providing an analog output signal to a sensor output terminal, said output signal corresponding to said magnetic signal and the rotational speed of said shaft;
   means for fixing said Hall sensor to said bearing second member; and an adaptive threshold circuit connected to said sensor output terminal, and processing said sensor output signal to provide a square-wave digital output signal, said adaptive threshold circuit consisting of:

(1) a comparator having first and second analog input connected to said sensor output terminal and having a positive feedback signal from said comparator output terminal connected to said first comparator input terminal to provide hysteresis; and (2) a second analog comparator input signal terminal connected to said sensor output terminal and a low-pass filter in series, said low-pass filter consisting of a resistor and a capacitor;

said comparator being responsive to the relative amplitudes of said first and second input signals so as to provide a corresponding digital output signal to said comparator output terminal, and said adaptive threshold circuit being integrated entirely onto an integrated circuit ;chip, with the exception of said capacitor in said low-pass filter.

10. A bearing assembly according to claim 9 wherein said adaptive threshold circuit further consists of a second capacitor connected between said first and second comparator input terminals.

11. A bearing assembly according to claim 9 wherein said Hall sensor and said adaptive threshold circuit are incorporated on a printed circuit board.

* * * * *